United States Patent
Bandukwala et al.

(10) Patent No.: US 9,069,794 B1
(45) Date of Patent: Jun. 30, 2015

(54) DETERMINING LOCATION INFORMATION FOR IMAGES USING LANDMARK, CAPTION, AND METADATA LOCATION DATA

(71) Applicant: Google Inc., Mountain View, CA (US)

(72) Inventors: Farhana Bandukwala, San Clemente, CA (US); Hartwig Adam, Marina Del Rey, CA (US); John Flynn, Venice, CA (US); Krzysztof Sikora, Canton of Schwyz (CH); Marco Andreetto, Los Angeles, CA (US); Arcot J. Preetham, Cupertino, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/052,157

(22) Filed: Oct. 11, 2013

(51) Int. Cl.
*G06F 17/30* (2006.01)
*G06K 9/46* (2006.01)

(52) U.S. Cl.
CPC ............ *G06F 17/30256* (2013.01); *G06K 9/46* (2013.01)

(58) Field of Classification Search
CPC combination set(s) only.
See application file for complete search history.

(56) References Cited

U.S. PATENT DOCUMENTS

| | | | |
|---|---|---|---|
| 7,660,468 B2 * | 2/2010 | Gokturk et al. | 382/224 |
| 8,212,834 B2 * | 7/2012 | Bogart et al. | 345/581 |
| 8,311,556 B2 | 11/2012 | Wang et al. | |
| 8,422,794 B2 * | 4/2013 | Ptucha et al. | 382/209 |
| 8,437,777 B2 | 5/2013 | Wang et al. | |
| 2009/0290812 A1 * | 11/2009 | Naaman et al. | 382/305 |
| 2012/0013767 A1 | 1/2012 | D'Souza et al. | |
| 2012/0020578 A1 * | 1/2012 | Yadid et al. | 382/229 |
| 2012/0258776 A1 * | 10/2012 | Lord et al. | 455/556.1 |
| 2013/0138685 A1 * | 5/2013 | Brucher et al. | 707/769 |
| 2013/0202198 A1 * | 8/2013 | Adam et al. | 382/159 |
| 2013/0246409 A1 | 9/2013 | Polansky et al. | |
| 2014/0072173 A1 * | 3/2014 | Haas et al. | 382/103 |

* cited by examiner

*Primary Examiner* — Neveen Abel Jalil
*Assistant Examiner* — Karina Levitian
(74) *Attorney, Agent, or Firm* — Fish & Richardson P.C.

(57) ABSTRACT

Methods, systems, and apparatus are provided for determining location information for images. In one aspect, a method includes obtaining landmark location data from content depicted in an image and corresponding confidence scores. Also, the method includes obtaining caption location data from user input and corresponding confidence scores, and obtaining metadata location data from data provided by an image capturing device. Further, the method includes identifying location pairs from the landmark, caption, and metadata location data, and generating, for each location pair, a geographic consistency score. Additionally, the method includes selecting a location pair based on the geographic consistency scores, and selecting an image location for the image from the selected location pair. Moreover, the method includes determining an image location score based on a confidence score for one of the locations in the selected location pair, and associating the image location and image location score with the image.

17 Claims, 5 Drawing Sheets

US 9,069,794 B1

DETERMINING LOCATION INFORMATION FOR IMAGES USING LANDMARK, CAPTION, AND METADATA LOCATION DATA

BACKGROUND

This specification relates to determining location information for images.

The Internet has enabled access to a wide variety of resources, e.g., video and/or audio files, web pages for particular subjects, news articles, images, etc. The Internet also provides Internet users with access to a variety of systems for interacting with, creating, and managing resources, such as cloud storage systems for storing data and social network sites for uploading and/or publishing images, videos, and messages. Various resource management systems allow Internet users access to a variety of resource management services, such as image management systems that facilitate organization, display, searching, and sharing of image files.

SUMMARY

This specification describes technologies relating to determining location information for images.

In general, one innovative aspect of the subject matter described in this specification can be embodied in methods that include the actions of obtaining landmark location data for an image, the landmark location data specifying one or more landmark locations derived from content depicted in the image and, for each landmark location, a landmark confidence score that indicates a measure of confidence that the image depicts content associated with the landmark location; obtaining caption location data for the image, the caption location data specifying one or more caption locations derived from user input and, for each caption location, a caption confidence score that indicates a measure of confidence that the image depicts content associated with the caption location; obtaining metadata location data for the image, the metadata location data specifying a metadata location derived from data provided by an image capturing device that captured the image; identifying location pairs from the landmark location data, caption location data, and metadata location data, each location pair including two of a landmark location, caption location, and metadata location; generating, for each location pair, a geographic consistency score that indicates a measure of consistency between locations specified in the location pair; selecting a location pair based at least in part on the geographic consistency scores; selecting an image location for the image from the locations specified in the selected location pair; determining an image location score for the image location based on a confidence score for one of the locations specified in the selected location pair; and associating the image location and image location score with the image. Other embodiments of this aspect include corresponding systems, apparatus, and computer programs, configured to perform the actions of the methods, encoded on computer storage devices.

These and other embodiments can each optionally include one or more of the following features. The method may further comprise ranking each location pair according to a pre-determined hierarchy of location types, and wherein selecting a location pair based at least in part on the geographic consistency scores further comprises selecting a location pair based at least in part on the location pair rankings.

The method may further comprise: identifying a confidence score for a location specified in the selected location pair; identifying a location type for the location; and generating a topicality score for the image based on the identified confidence score and the identified location type.

Identifying a confidence score for a location specified in the selected location pair may comprise identifying a confidence score for a location specified in the selected location pair based on the pre-determined hierarchy of location types.

Selecting an image location for the image from the locations specified in the selected location pair may comprise selecting an image location for the image from the locations specified in the selected location pair based on the pre-determined hierarchy of location types.

Generating a topicality score for the image may comprise: inputting the identified confidence score into a function that corresponds to the identified location type, wherein the function is one of three different functions that each correspond to a different location type; and obtaining the topicality score for the image as output from the function.

The landmark data may be obtained from a landmark processor that i) identifies landmark images that are visually similar to the image and ii) provides, as landmark locations for the image, landmark locations that are associated with the identified landmark images; the caption location data may be obtained from a caption processor that derives one or more caption locations from user input that includes one or more of an image caption, an album title, and an image tag; and the metadata location data may be obtained from a metadata processor that derives a metadata location from EXIF data for the image.

Particular embodiments of the subject matter described in this specification can be implemented so as to realize one or more of the following advantages. Determining the location of an image may be useful for organizing images according to location. With respect to information retrieval, images with associated locations may be more likely to be identified during an image search, and image location confidence scores may be used to affect image search result rankings, providing users with images that are likely to satisfy the user's informational need. In addition, a topicality score for an image may be used to organize images for a particular location based on a topicality of the image, which may result in displaying images in a topically relevant order for a given location. With respect to information retrieval, topicality scores may be used to identify images that are relevant to a location based query and to affect image search result rankings, providing users with image search results that are likely to satisfy the user's informational need. Topicality scores may also be used to prune search results, providing only the most relevant and/or topical image search results to users, which can decrease resource and bandwidth usage in a networked search environment.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
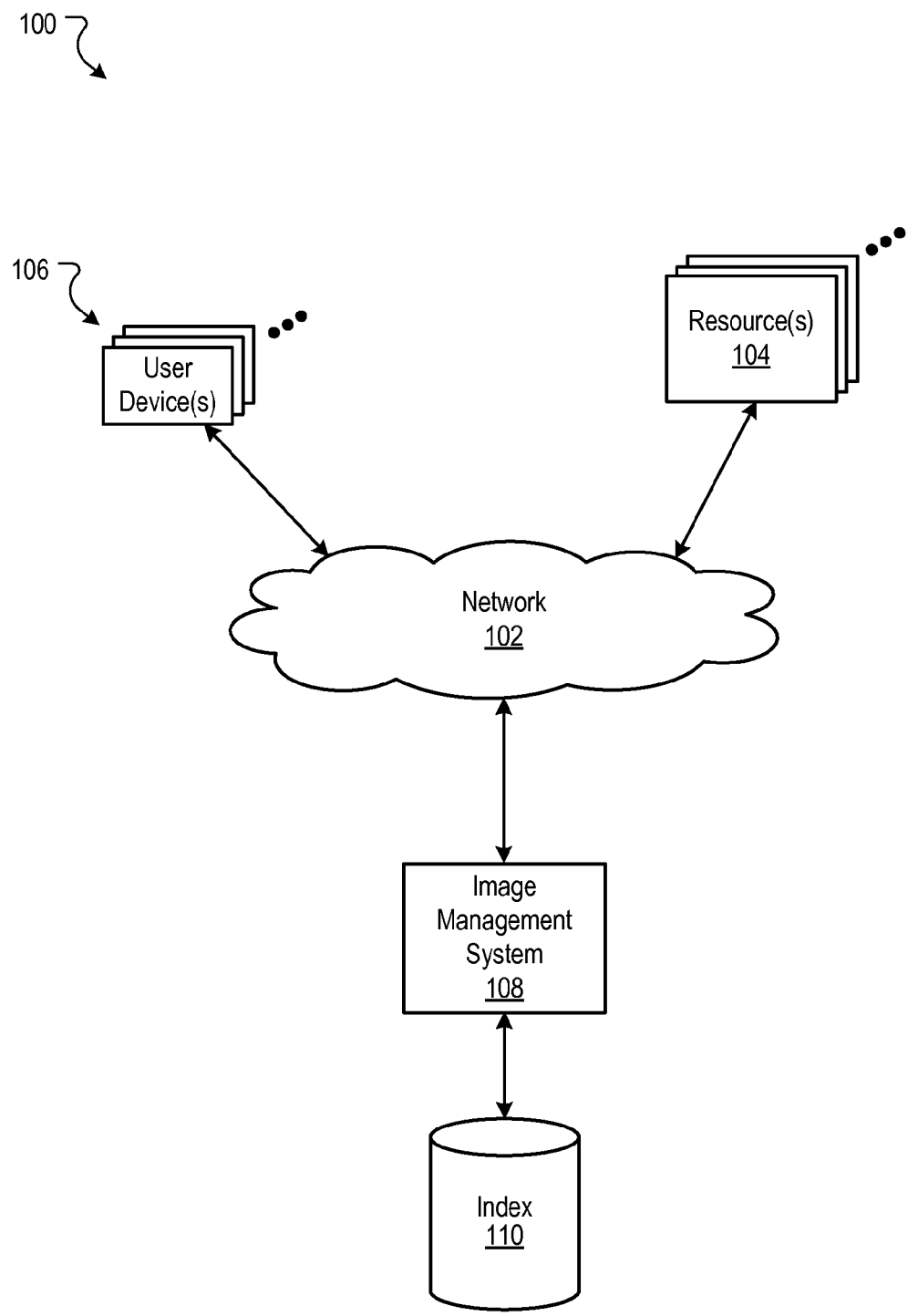
FIG. 1 is a block diagram of an example environment in which location information for images is determined.

An image management system identifies locations and generates topicality scores for images. Various information sources of location information for an image are analyzed to identify a location to associate with the image, and the location information may also be used to generate a topicality score for an image that indicates how representative the image is of the identified location. Location data for images, including topicality scores, may be stored in an index and used for information retrieval.

In some implementations, an image management system obtains three different types of location data for an image—landmark location data, caption location data, and metadata. Landmark location data specifies landmark locations and corresponding confidence scores. For example, a landmark processor may compare the image to other images that depict landmarks or other iconic locations, and provide the image management system with locations that are associated with those other images. Caption location data specifies caption locations and corresponding confidence scores. For example, a caption processor may analyze user-supplied image captions, album names, and image tags to identify locations referenced by the data and provide the image management system with the locations and corresponding confidence scores. Metadata location data specifies a geographic location for an image. For example, Exif data for an image may indicate geographic coordinates for the image.

After obtaining the location data, the image management system pairs locations of each location type to the locations of each other location type. For example, each landmark location is paired with each caption location and metadata location, and each caption location is paired with each metadata location. The image management system generates geographic consistency scores for the location pairs. The geographic consistency score indicates how consistent one location of the pair is with the other location of the pair. For example, if a landmark location specifies the geographic area associated with the Empire State Building (in New York City, N.Y., United States), and it is paired with a caption location that specifies New York City, the locations would be consistent, though not identical. However, if the same landmark location were paired with a caption location that specified Paris, France, the locations would be inconsistent. The geographic consistency score could be binary (e.g., either consistent or inconsistent) or could have a range of consistency, e.g., a 0.0 to 1.0 scale, where 0.0 is completely inconsistent and 1.0 is completely consistent/identical).

One location pair is selected based at least in part on the geographic consistency scores. In some implementations, a location pair is also selected based on a pre-determined hierarchy of location types, where some location types are ranked higher than others. For example, the image management system may select the location pair with the highest geographic consistency score among location pairs that include, according to the pre-determined hierarchy, the highest ranked location types.

From the selected location pair, an image location is selected for the image. For example, the location of the highest ranked location type specified in the selected location pair may be the location selected by the image management system for the image. Thus, the selected location pair may include a landmark location and a caption location, and the landmark location may be ranked higher than the caption location based on the pre-determined hierarchy, in which case the landmark location would be selected as the location for the image.

The image management system also determines an image location score for the selected image location. For example, if a landmark location is selected as the location for the image, the image location score may be the previously obtained confidence score for the selected landmark location.

The image management system may optionally generate a topicality score for the image in addition to selecting a location and determining a location score for the image. The topicality score indicates, for example, how representative the image is of the selected location. Thus, if the image location is determined to be the Empire State Building, the topicality score indicates how well the image represents the Empire State Building.

After determining location information, such as a location, location score, and topicality score, for an image, the image management system may associate that information with the image in an index.

FIG. 1 is a block diagram of an example environment 100 in which location information for images is determined. A computer network 102, such as a local area network (LAN), wide area network (WAN), the Internet, or a combination thereof, connects publisher resources 104, user devices 106, and an image management system 108. The online environment 100 may include many thousands of publisher resources 104 and user devices 106.

A resource 104 is data that can be provided by a publisher over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as scripts).

A user device 106 is an electronic device capable of requesting and receiving resources 104 over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website.

User devices 106 may communicate with the image management system 108 to search for and manage image resources. For example, the image management system 108 may receive image resources from user devices 106 and facilitate organization of the image resources. The image management system 108 may also provide user devices 106 with a front end user interface through which the user devices 106 can manage image resources.

For example, the image management system 108 may provide image management services for a social networking website, where users can, for example, upload images, create captions for images, create photo albums, tag images with relevant people or topics, and organize images. Images uploaded by user devices 106 to the image management system may be stored in a data storage device, such as the index 110, along with image data, such as the user provided captions, tags, album titles, and image metadata.

Access to images stored in the index 110 may be private, public, or accessible to subset of users. For example, a user may upload images that are only accessible to that user, while another user may upload images that are viewable by a subset of the user's social networking affiliates, and yet another user may upload images that are viewable to any network or social network user. Users may query the image management system to identify images that were either previously uploaded by the user, by the user's social network affiliates, and/or by users of the network.

To facilitate searching of these image resources, the image management system 108 may also identify image resources by crawling publisher web sites and indexing the image resources provided by the publisher web sites. The indexed and, optionally, cached copies of the resources, may also be stored in the index 110. In some implementations, the image management system 108 may have multiple indices, such as one index for images provided to the image management system 108 directly by users, and a second index for images obtained from publisher websites.

The image management system 108 may also determine image location data for images, which can be stored in the index 110 and used for labeling images and/or for retrieving images in response to user queries. As described in further detail below, the image management system 108 may obtain location information for images from various sources to determine locations relevant to an image. The determined locations may be used, for example, to organize images and/or to provide images relevant to particular locations in response to a user query.

Figure 2:
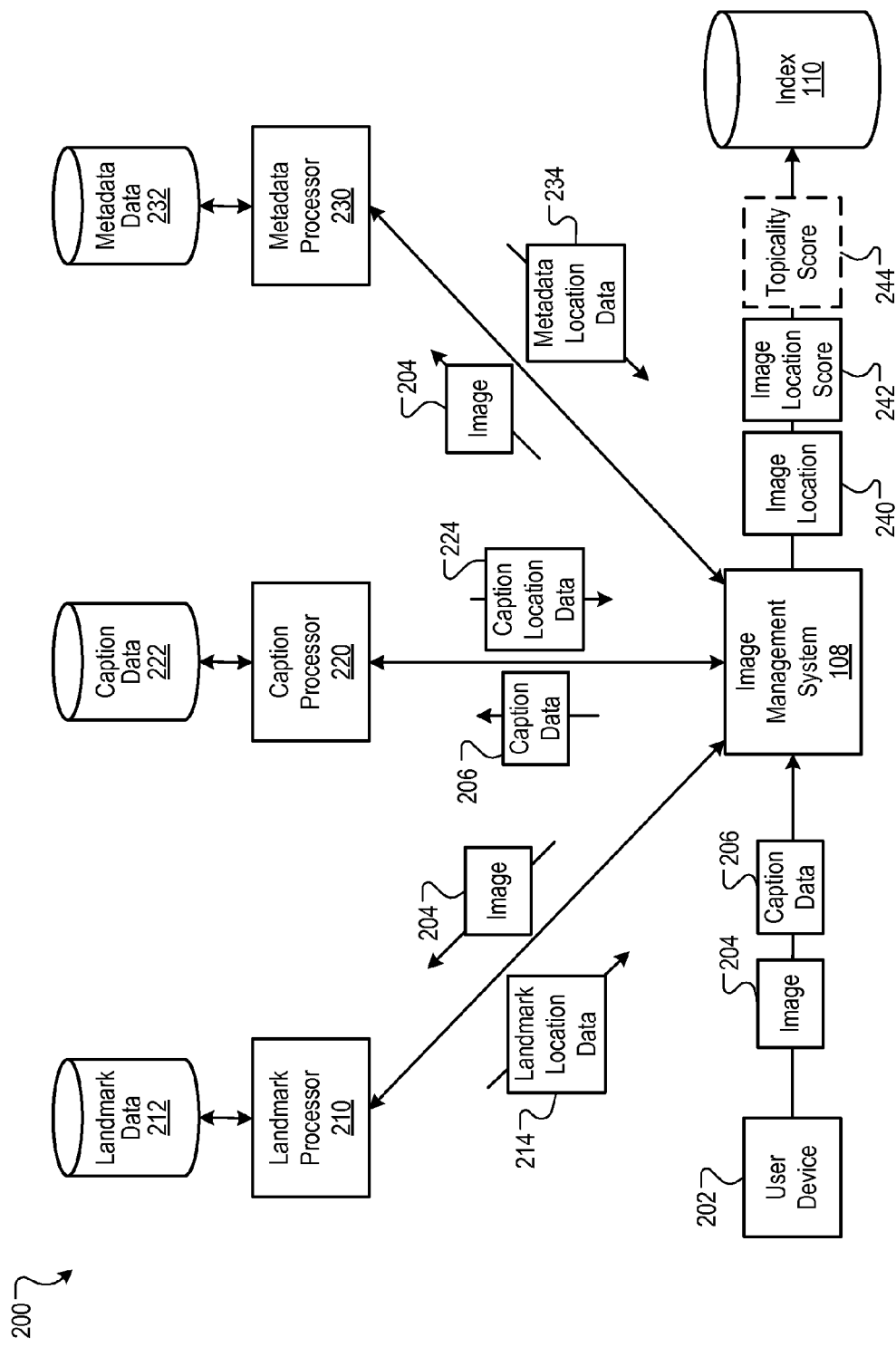
FIG. 2 is a block diagram of an example process for determining image location information for in image.

FIG. 2 is a block diagram of an example process 200 for determining image location information for in image. In the example process 200, a user device 202 provides an image 204 and caption data 206 to the image management system 108. In some implementations, further processing of the image 204 and caption data 206 to determine image location information may be performed in response to receipt of the image 204 and caption data 206, or at a later time, e.g., in a batch process performed at a particular time or in response to an affirmative request to determine location information.

By way of example, the user device 202 may be a smart phone with a camera, and the image 204 may be an image of the Empire State Building in New York City, which was captured by the smart phone's camera. The caption data 206 may include a user-provided caption, e.g., "The Empire State Building," and the image may be designated as part of a user image album entitled, "Summer trip to Weehawken, N.J."

The image management system 108 provides the image 204 to a landmark processor 210, which uses landmark data 212 to identify landmark location data 214 for the image. The landmark location data 214 specifies one or more locations that are derived from the content depicted in the image 204 and, for each location, a confidence score that indicates a measure of confidence that the image 204 depicts content associated with the location. For example, the landmark processor 210 may compare the image 204 to images with known locations to identify similar images, and identify the locations of those similar images as a landmark location for the image 204.

By way of example, the landmark data 212 may include an index of images with known locations associated with them. Several images of the Empire State Building, for example, from various angles and perspectives, during different seasons, and during the day and at night, may be stored in the landmark data 212 and associated with the location (e.g., latitude/longitude or zip code) of the Empire State Building. As another example, several images of the Washington Monument, also from various angles and perspectives, during different seasons, and during the day and at night, may be stored in the landmark data 212 and associated with the location of the Washington Monument.

The landmark processor 210 uses various image feature detection and comparison techniques to identify images that are visually similar to the provided image 204. If, for example, the image 204 is a relatively clear image of the Empire State Building, the landmark processor 210 may determine that the image 204 is similar to one or more images of the Empire State Building, and identify the location of the Empire State Building as a landmark location for the image 204. The landmark location confidence score may depend on, for example, how close the image 204 matches one or more images with a known location for the Empire State Building, or how strong an association is between the similar images and the location of the Empire State Building.

Multiple landmark locations may be identified for an image. For example, the image 204 of the Empire State Building may also be visually similar to one or more images of the New York-New York Hotel and Casino in Las Vegas, Nev., which has a large replica of the Empire State Building. A confidence score for the location of the hotel, however, may be lower than that of the location for the Empire State Building in New York City if, for example, the image 204 does not match the images of the hotel as well as it matches the images of the real Empire State Building.

In addition to using images of buildings and architecture as example landmark images, the landmark data 212 may include other types of images with associated locations. For example, street level images, such as an image of a storefront taken from the street, may be stored in the landmark data 212 and associated with the address of the store. Another example includes images of art, such as an image of the Mona Lisa painting, which may be associated with a location of the artwork, e.g., The Louvre, in Paris, France. As another example, any location with a relatively large number of images associated with that location may be stored in the landmark data 212, such as a department store or restaurant in which many images have been captured.

After identifying landmark locations for the image 204 and corresponding landmark confidence scores, the landmark processor 210 provides the image management system 108 with the landmark location data 214.

The image management system 108 provides the caption data 206 to a caption processor 220, which uses caption data 222 to identify caption location data 224 for the image 204. The caption location data 224 specifies one or more locations derived from user input, such as an image caption and album title, and a corresponding confidence score for each location that indicates a measure of confidence that the image depicts content associated with the location. In some implementations, the caption processor 220 parses user supplied text and interprets textual references to particular locations. For example, the caption processor 220 may compare the text of an image album, caption, or tag to an index of locations and/or location nicknames.

By way of example, the caption processor 220 may derive one or more image locations from the caption, "The Empire State Building," and the image album title, "Summer trip to Weehawken, N.J." The caption may be associated with multiple locations, such as New York City, Midtown Manhattan, and the Empire State Building. The confidence score for each location may reflect, for example, how well the caption matches the location, how precise the geographic location is, or how important a caption is relative to an album title or image tag. The caption processor 220 may also account for correct spelling errors, ambiguities, partial names, and nicknames. For example, a caption of "The Big Apple" can be identified as matching New York City, and the caption "New York" can be associated with both the state of New York and New York City.

In some implementations, where multiple matched locations exist for one type of caption data, a single caption location is selected. The single caption location may be, for example, the highest scoring caption location. For example, the caption "The Empire State Building," may match three different locations, but the location of the Empire State Building is the best semantic match and the most precise geographic match, so its confidence score may be the highest of three matching locations. Accordingly, other caption locations for that image caption may be discarded. As another example, the image album title, "Summer trip to Weehawken, N.J.," may match the location of Weehawken, N.J. and the state of New Jersey. As the city location is a more precise match, it may be the caption location selected for the image album title.

After identifying caption locations for the image 204 and corresponding caption confidence scores, the caption processor 220 provides the image management system 108 with the caption location data 224.

The image management system 108 provides the image 204 to a metadata processor 230, which uses metadata data 232 to identify metadata location data 234 for the image 204. The metadata location data 234 specifies a location derived from data that is provided for the image 204 by an image capturing device. For example, a camera used to capture an image may associate metadata with the image, such as a date/time the image was captured, the type of camera, the size of the image, the location of the camera at the time the image was captured, and other information.

By way of example, the smart phone used to capture the image 204 may have included Exchangeable image file format ("Exif") data with the image that specifies the latitude and longitude of the smart phone when the image was captured. In the above example, the image 204 may include Exif data that specifies the location at 40°46'08" N, 74°00'56"W, which the metadata processor 230 may identify as a location in Weehawken, N.J.

In some implementations, a confidence score may be associated with a metadata location. For example, a confidence score may simply be binary, e.g., a 1 or 0, indicating that the location data either exists, or does not. As another example, a confidence score for a metadata location may have a range of confidence that depends on the source of the location data, if known. For example, a location derived from cell phone tower triangulation may be less precise then a location derived from Wifi hotspot location, which may in turn be less precise than a location provided by a global positioning system (GPS).

After identifying a metadata location for the image 204, the metadata processor 230 provides the image management system 108 with the metadata location data 234.

The image management system uses the landmark location data 214, the caption location data 224, and the metadata location data 234 to select an image location 240 for the image, determine an image location score 242 for the image 204, and, in some implementations, generate a topicality score 244 for the image 244. The image location 240, image location score 242, and optional topicality score 244 are associated with the image 204 and stored in the index 110. Selecting an image location 240, determining an image location score 242, and generating a topicality score 244 are described in further detail with respect to FIG. 3. While the landmark processor 210, caption processor 220, and metadata processor 230 are depicted separately in the example process 200, they may be part of the same system, and may also be included in the image management system 108. Similarly, the landmark location data 212, caption location data 222, and metadata location data 232 may be separate data storage devices, separate partitions of the same data storage device, or included in a single data storage device, such as the index 110.

Figure 3:
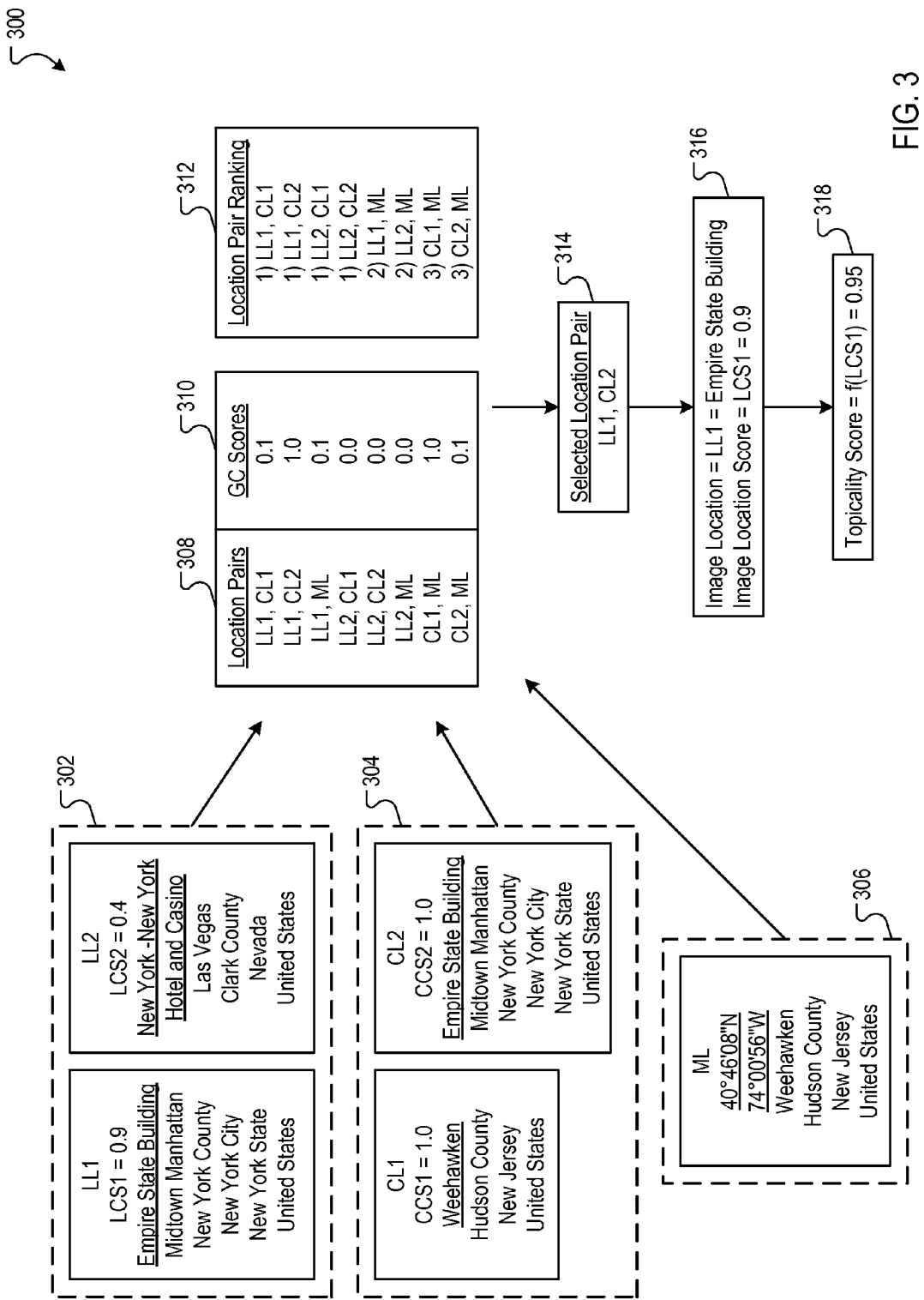
FIG. 3 is a data flow of an example process for determining image location information for an image.

FIG. 3 is a data flow of an example process 300 for determining image location information for an image. The process 300 may be performed, for example, by an image management system.

As discussed above, the image management system obtains landmark data 302, caption data 304, and metadata data 306 for an image. The example landmark location data 302 includes two landmark locations: LL1, which is the location of the Empire State Building in New York City, and LL2, which is the location of the New York-New York Hotel and Casino (the "Hotel"). The example caption location data 304 includes two caption locations: CL1, which is the location of Weehawken, N.J., and CL2, which is the location of the Empire State Building in New York City. The example metadata location data 306 includes one metadata location: ML, which is at 40°46'08" N, 74°00'56"W—coordinates in Weehawken, N.J.

Each landmark location and caption location has a corresponding confidence score. The example confidence scores are represented on a scale from 0.0 to 1.0, with 0.0 being no confidence, and 1.0 being a maximum confidence. For example, LCS1 is the landmark confidence score for LL1 and, at 0.9, LCS1 indicates a relatively high confidence that the image depicts something that matches an image associated with the location of the Empire State Building. LCS2 is the landmark confidence score for LL2 and, at 0.4, LCS2 indicates a moderate level of confidence that the image depicts something that matches an image associated with the location of the Hotel. CCS1 is the caption confidence score for CL1 and, at 1.0, CCS1 indicates a maximum confidence that the image is associated with Weehawken, N.J. CCS2 is the caption confidence score for CL2 and, at 1.0, it CCS2 also indicates a maximum confidence that the image is associated with the location of the Empire State Building. The confidence score scale of 0.0 to 1.0 is an example, and other value ranges, including binary values, can be used for a confidence score scale.

Each example location in the example process 300 is shown with a corresponding geographic hierarchy. The geographic hierarchy begins with the actual location identified and expands to successively less geographically precise locations, e.g., the Empire State Building has a location (possibly associated with a zip code or geographic coordinates defining an physical area), which is within Midtown Manhattan, which is within New York County, which is within New York City, which is within New York State, which is in the United States. This geographic hierarchy may be identified by the image management system or by separate location processors.

Location pairs 308 are identified from the landmark location data 302, the caption location data 304, and the metadata location data 306. Each location pair includes a location from two different sources. For example, each landmark location is paired with each caption location and the metadata location, and each caption location is paired with the metadata location.

Geographic consistency scores 310 are generated for each location pair. Each geographic consistency score indicates a measure of consistency between the locations specified by the corresponding location pair. As with the example confidence scores, example geographic consistency scores are represented on a scale from 0.0 to 1.0, with 0.0 being no confidence, and 1.0 being a maximum confidence. For example, the location pair LL1, CL1 has a geographic consistency score of 0.1 which indicates a relatively low confidence that the locations are consistent. While New York State and New Jersey are geographically adjacent to one another, neither geographic location overlaps with the other, and in some implementations they are not likely to be considered highly consistent. LL1 and CL2, on the other hand, are exact matches, and the geographic consistency score of 1.0 indicates that there is a high confidence that the two locations are consistent.

CL1 (Weehawken, N.J.) and ML (Lat. Long. in Weehawken, N.J.) are not exact location matches, because ML is more precise than CL1, but they are geographically consistent because both one location includes the other at a relatively precise level. If, for example, a caption location indicated the location of Jersey City, N.J., this may be relatively consistent with Weehawken, N.J., because both cities are geographically located within Hudson County in New Jersey. However, because they do not overlap, or include one another, a geographic consistency score between Weehawken, N.J. and Jersey City, N.J., may be lower than the geographic consistency score between CL1 and ML and, in some implementations, may also be lower than a geographic consistency score between Weehawken, N.J. and Hudson County.

In some implementations, geographic consistency scores may weigh precision, or granularity, more than geographic inclusiveness. For example, two geographic locations within different boroughs of New York City may be more geographically consistent that two geographic locations that both indicate New York State. In some implementations, geographic consistency scores may weigh geographic inclusiveness more than precision, or granularity. For example, Albany, N.Y. may be more geographically consistent with New York State than two geographic locations within different boroughs of New York City.

In some implementations, the geographic consistency score for a location pair may be based, in part, on the confidence scores that correspond to the locations of the pair. For example, a location pair that includes two locations with high confidence scores may be more geographically consistent than a location pair that includes two similar locations with low confidence scores.

Other measurements may also be used to determine geographic consistency. Example measurements include a geographic distance between points centered within a location, a geographic distance between location edges, and geographic area within one location of a pair relative to the position of the geographic area of the other location of the pair.

In some implementations, as depicted in the example process 300, location pairs are ranked 312 according to a pre-determined hierarchy of location types. For example, a location hierarchy may indicate that landmark locations have a higher priority than caption locations, which in turn have a higher priority than metadata locations. In some implementations, the location pairs are first ranked according to the geographic consistency scores, and then according to the hierarchy. For example, location pairs that include a landmark location may be ranked higher than any other location pair, and within the location pairs that include a landmark location, the location pairs are ranked according to geographic consistency scores.

In the example location pair rankings 312, location pairs that include a landmark location and caption location are ranked higher than location pairs that include a landmark location and a metadata location, which are in turn ranked higher than location pairs that include a caption location and metadata location. Within each tier or location pairings, the location pairs are further ranked according to geographic consistency scores. Thus, the location pair, LL1, CL2 is in the top ranked hierarchy, and has the highest geographic consistency score, so it is ranked higher than the other location pairs. Even though CL1, ML has a geographic consistency score of 1.0, it is ranked lower than every other location pair with a higher priority according to the hierarchy of location types.

Other location hierarchies may be used. For example, a hierarchy of locations may specify that metadata locations are the highest priority, and that other location types are treated equally. The hierarchy of location types may be determined empirically, based on user feedback regarding which location type or location pair produces the most favorable location results. The hierarchy of location types may also change if, for example, one type of location becomes more relevant in determining a location than another type.

In some implementations, the location pair rankings may be based, at least in part, on the location confidence scores. For example, location confidence scores for locations of a pair can be used as a multiplier for geographic consistency scores. As another example, the location confidence score or the highest priority location of a pair may be used to rank location pairs. In some implementations, location pairs including a location with a corresponding confidence score that is less than a pre-determined confidence score threshold may be discarded or demoted in location pair rankings.

In some implementations, the location pair may be selected based at least in part on the location pair rankings and/or geographic consistency scores. For example, the example process 300 includes the selected location pair 314 of LL1, CL2 because it is the location pair with the highest geographic consistency score among the top tier of location pair types.

An image location and image location score are selected 316 based on the selected location pair 314. For example, the image location may be the location of the selected location pair 314 that has the highest priority in the pre-determined hierarchy. In the above example, the landmark location has a higher priority than the caption location, so the location LL1 is selected. The image location may indicate, for example, a location depicted in the corresponding image. In some implementations, the image location may be the location of the selected location pair 314 that has the highest location confidence score. For example, the confidence score of CL2 is higher than the confidence score of LL1, so location CL2 is selected.

In some implementations, the image location score is the location confidence score of the image location. For example, the image location score for LL1 is 0.9, so if LL1 is selected as the image location, the image location score is also 0.9. In some implementations, the image location score may be based on the confidence scores of both locations of the selected location pair 314 and/or the geographic consistency scores. For example, the image location score may be the geographic consistency score, which in the example process is 1.0. As another example, the image location score may be the average of both location confidence scores, e.g., (0.9+ 1.0)/2=0.95. The image location and image location score 316 for an image can be associated with the image in an index and used for image search and organization purposes. The image location score may indicate, for example, a confidence that the image depicts content associated with the image location.

In some implementations, as shown in the example process 300, a topicality score 318 is generated for an image. The topicality score indicates a measure of confidence that the image is representative of its image location. For example, if the image location is identified as the location of the Empire State Building, the topicality score may specifically quantify how representative the image is of the Empire State Building. As another example, the topicality score may indicate how relevant the image is to the Empire State Building, or how iconic the image is with respect to the Empire State Building.

In some implementations, the topicality score for an image may be based on the source of the image location and the image location score. In the example process 300, the image location is a landmark location. Each location type—landmark, caption, and metadata—may have a corresponding topicality score function, and the image location score may be used input into whichever function corresponds to the location type from which the image location was selected. For example, the example image location score (e.g., 0.9) may be used as input into a topicality score function specific to landmark locations. In some implementations, topicality score functions may exist for each type of location pair. For example, a topicality function for a landmark location—caption location pair may be different from a topicality function for a landmark location—metadata location pair. The topicality function used may depend on the locations of the selected location pair 314.

Each topicality score function may be generated based on empirical feedback regarding results of the various functions. For example, user feedback may indicate that landmark locations, which are identified based on visual similarity to other images that are associated with a location, are a strong indicator of how representative an image is of the landmark location. On the other hand, metadata locations, which are identified based on the location of the user device at the time the image was captured, may not provide a strong indication of what the image actually depicts. For example, an image that is visually similar to other images of the Empire State Building may be more likely to be representative of the Empire State Building than an image having metadata indicating its geographic coordinates are in the same location as the Empire State Building. A picture taken in the Empire State Building could be a picture of the interior of the building, or a picture taken from the observation deck of the building, which may be less likely to be representative or iconic of the Empire State Building. As with image locations and image location scores, topicality scores for images may be associated with the images in an index.

Image locations, image location scores, and topicality scores may be used, for example, for image organization and image retrieval. For example, when a user issues the query, "The Empire State Building," to an image management system, the image management system can use image locations, image location scores, and topicality scores in an index to provide images likely to be of interest to the user. As another example, the image management system may automatically organize a user's image collection according to location and, within each location, according to topicality scores. Thus, a user's image collection may be presented to the user in a manner that places the most iconic images, e.g, the images with the highest topicality scores, first.

Figure 4:
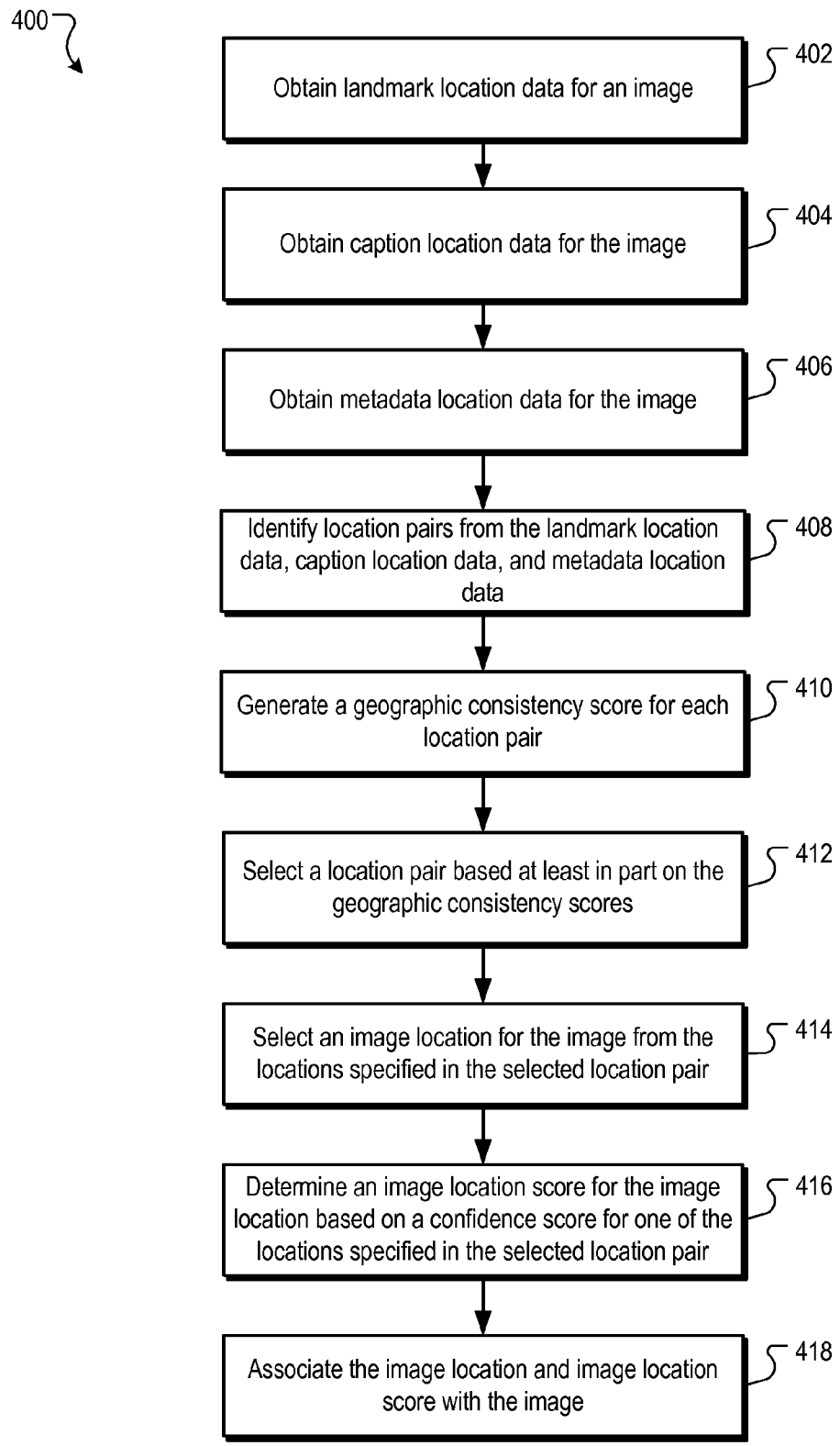
FIG. 4 is a flow diagram of an example process in which location information is determined for an image.

FIG. 4 is a flow diagram of an example process 400 in which location information is determined for an image. The process 400 may be implemented by one or more data processing apparatus, such as an image management system.

Landmark location data is obtained for an image (402). The landmark location data specifies one or more landmark locations derived from content depicted in the image and, for each landmark location, a landmark confidence score that indicates a measure of confidence that the image depicts content associated with the landmark location. For example, landmark location data for an image of the Mona Lisa may indicate The Louvre, in Paris, France. In some implementations, the landmark data is obtained from a landmark processor that i) identifies landmark images that are visually similar to the image and ii) provides, as landmark locations for the image, landmark locations that are associated with the identified landmark images.

Caption location data is obtained for the image (404). The caption location data specifies one or more caption locations derived from user input and, for each caption location, a caption confidence score that indicates a measure of confidence that the image depicts content associated with the caption location. For example, the image of the Mona Lisa may be in an image album that a user has entitled, "Vacation in France," from which the caption location, France, may be obtained. In some implementations, the caption location data is obtained from a caption processor that derives one or more caption locations from user input that includes an image caption, an album title, and/or an image tag.

Metadata location data is obtained for the image (406). The metadata location data specifies a metadata location derived from data provided by an image capturing device that captured the image. For example, the camera used to take the picture of the Mona Lisa may have created Exif data for the image that indicates geographic coordinates of the camera, which may indicate that the image was captured in The Louvre.

Location pairs are identified from the landmark location data, caption location data, and metadata location data (408). Each location pair includes two different location types from the landmark location, caption location, and metadata location. For example, one pair for the image of the Mona Lisa may be the landmark location of The Louvre and the caption location of France, while another may be the landmark location of The Louvre and the metadata location of The Louvre.

A geographic consistency score is generated for each location pair (410). Each geographic consistency score indicates a measure of consistency between locations specified in a location pair. For example, the landmark location of the Mona Lisa image and the metadata location are identical, and may therefore have a maximum geographic consistency score. The landmark location (The Louvre) is within the caption location (France), which is consistent, but the lack of precision for the caption location may result in a relatively low geographic consistency score for the landmark location—caption location pair.

A location pair is selected based at least in part on the geographic consistency scores (412). For example, the location pair with the highest geographic consistency score may be selected. In some implementations, each location pair is ranked according to a pre-determined hierarchy of location types, and a location pair is selected based at least in part on the location pair rankings and geographic consistency scores. For example, location pairs may first be ranked according to geographic consistency scores and then ranked according to the pre-determined hierarchy.

An image location is selected for the image from the locations specified in the selected location pair (414). In some implementations, an image location for the image is selected from the locations specified in the selected location pair based on the pre-determined hierarchy of association types. For example, if the landmark location—metadata location pair was selected, and the metadata location has the highest priority according to the pre-determined hierarchy, the metadata location may be selected as the image location for the image.

An image location score is determined for the image based on a confidence score for one of the locations specified in the selected location pair (416). For example, the image location score may be the confidence score of the location included in the selected pair with the highest priority according to the pre-determined hierarchy, e.g., the metadata location.

In some implementations, the process 400 includes identifying a confidence score for a location specified in the selected location pair, identifying a location type for the location, and generating a topicality score for the image based on the identified confidence score and the identified location type. For example, the process 400 may identify a confidence score for a location specified in the selected location pair based on the pre-determined hierarchy. The location with the higher priority according to the pre-determined hierarchy may be the location whose corresponding confidence score is identified.

In some implementations, generating a topicality score for the image includes inputting the identified confidence score into a function that corresponds to the identified location type. The function may be one of three different functions that each correspond to a different location type, and the topicality score may be obtained as output from the function. For example, if the metadata location has the highest priority according to the pre-determined hierarchy, and it is in the selected location pair, its corresponding metadata location confidence score may be provided, as input, to a topicality function specific to metadata location scores. The metadata location topicality score function, in turn, provides a topicality score for the image as output.

The image location and image location score are associated with the image (418). For example, the associations may be recorded in an index used for image organization and image search. In implementations where a topicality score is generated for the image, the topicality score may also be associated with the image and stored in an index.

Figure 5:
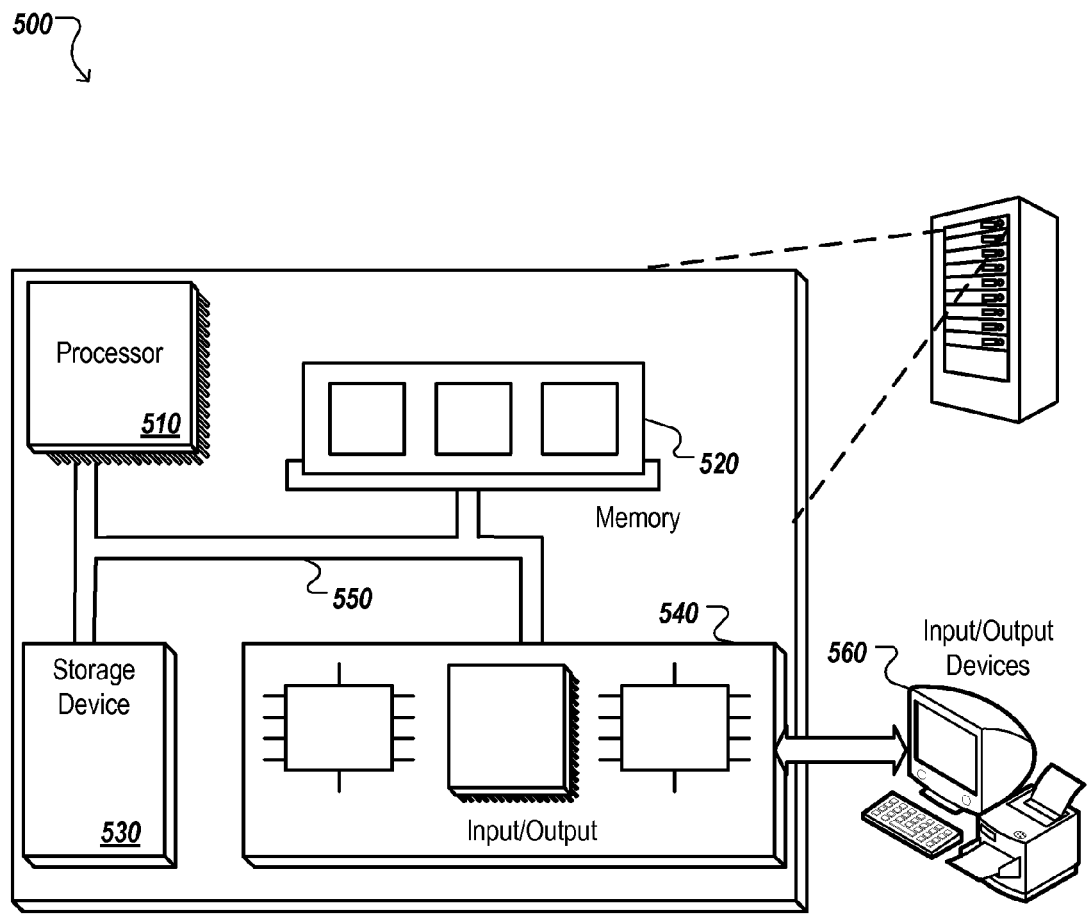
FIG. 5 is a block diagram of an example data processing apparatus.

FIG. 5 is a block diagram of an example data processing apparatus 500. The system 500 includes a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, or some other large capacity storage device.

The input/output device 540 provides input/output operations for the system 500. In one implementation, the input/output device 540 can include one or more network interface devices, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising:
   obtaining landmark location data for an image, the landmark location data specifying one or more landmark locations derived from content depicted in the image and, for each landmark location, a landmark confidence score that indicates a measure of confidence that the image depicts content associated with the landmark location;
   obtaining caption location data for the image, the caption location data specifying one or more caption locations derived from user input and, for each caption location, a caption confidence score that indicates a measure of confidence that the image depicts content associated with the caption location;

obtaining metadata location data for the image, the metadata location data specifying a metadata location derived from data provided by an image capturing device that captured the image;

identifying location pairs from the landmark location data, caption location data, and metadata location data, each location pair including two of a landmark location, caption location, and metadata location;

generating, for each location pair, a geographic consistency score that indicates a measure of consistency between locations specified in the location pair;

ranking each location pair according to a predetermined hierarchy of location types, the predetermined hierarchy specifying a first priority for landmark locations, a second priority for caption locations, and third priority for metadata locations, wherein the ranking of each location air is based on a highest priority of the locations specified in the location pair;

selecting a location pair based at least in part on the geographic consistency scores and location pair rankings;

selecting an image location for the image from the locations specified in the selected location pair;

determining an image location score for the image location based on a confidence score for one of the locations specified in the selected location pair; and associating the image location and image location score with the image.

2. The method of claim 1, further comprising:
identifying a confidence score for a location specified in the selected location pair;
identifying a location type for the location; and
generating a topicality score for the image based on the identified confidence score and the identified location type.

3. The method of claim 2, wherein identifying a confidence score for a location specified in the selected location pair comprises identifying a confidence score for a location specified in the selected location pair based on the pre-determined hierarchy of location types.

4. The method of claim 1, wherein selecting an image location for the image from the locations specified in the selected location pair comprises selecting an image location for the image from the locations specified in the selected location pair based on the pre-determined hierarchy of location types.

5. The method of claim 2, wherein generating a topicality score for the image comprises:
inputting the identified confidence score into a function that corresponds to the identified location type, wherein the function is one of three different functions that each correspond to a different location type; and
obtaining the topicality score for the image as output from the function.

6. The method of claim 1, wherein:
the landmark data is obtained from a landmark processor that i) identifies landmark images that are visually similar to the image and ii) provides, as landmark locations for the image, landmark locations that are associated with the identified landmark images;
the caption location data is obtained from a caption processor that derives one or more caption locations from user input that includes one or more of an image caption, an album title, and an image tag; and
the metadata location data is obtained from a metadata processor that derives a metadata location from EXIF data for the image.

7. A system comprising:
a data processing apparatus; and
a data store storing instructions that, when executed by the data processing apparatus, cause the data processing apparatus to perform operations comprising:

obtaining landmark location data for an image, the landmark location data specifying one or more landmark locations derived from content depicted in the image and, for each landmark location, a landmark confidence score that indicates a measure of confidence that the image depicts content associated with the landmark location;

obtaining caption location data for the image, the caption location data specifying one or more caption locations derived from user input and, for each caption location, a caption confidence score that indicates a measure of confidence that the image depicts content associated with the caption location;

obtaining metadata location data for the image, the metadata location data specifying a metadata location derived from data provided by an image capturing device that captured the image;

identifying location pairs from the landmark location data, caption location data, and metadata location data, each location pair including two of a landmark location, caption location, and metadata location;

generating, for each location pair, a geographic consistency score that indicates a measure of consistency between locations specified in the location pair;

ranking each location pair according to a predetermined hierarchy of location types, the predetermined hierarchy specifying a first priority for landmark locations, a second priority for caption locations, and third priority for metadata locations, wherein the ranking of each location pair is based on a highest priority of the locations specified in the location pair;

selecting a location pair based at least in part on the geographic consistency scores and location pair rankings;

selecting an image location for the image from the locations specified in the selected location pair;

determining an image location score for the image location based on a confidence score for one of the locations specified in the selected location pair; and associating the image location and image location score with the image.

8. The system of claim 7, wherein the operations further comprise:
identifying a confidence score for a location specified in the selected location pair;
identifying a location type for the location; and
generating a topicality score for the image based on the identified confidence score and the identified location type.

9. The system of claim 8, wherein identifying a confidence score for a location specified in the selected location pair comprises identifying a confidence score for a location specified in the selected location pair based on the pre-determined hierarchy of location types.

10. The system of claim 7, wherein selecting an image location for the image from the locations specified in the selected location pair comprises selecting an image location for the image from the locations specified in the selected location pair based on the pre-determined hierarchy of location types.

11. The system of claim 8, wherein generating a topicality score for the image comprises:

inputting the identified confidence score into a function that corresponds to the identified location type, wherein the function is one of three different functions that each correspond to a different location type; and obtaining the topicality score for the image as output from the function.

12. The system of claim 7, wherein:

the landmark data is obtained from a landmark processor that i) identifies landmark images that are visually similar to the image and ii) provides, as landmark locations for the image, landmark locations that are associated with the identified landmark images;

the caption location data is obtained from a caption processor that derives one or more caption locations from user input that includes one or more of an image caption, an album title, and an image tag; and the metadata location data is obtained from a metadata processor that derives a metadata location from EXIF data for the image.

13. A computer readable storage medium comprising instructions that, when executed by a data processing apparatus, cause the data processing apparatus to perform operations comprising:

obtaining landmark location data for an image, the landmark location data specifying one or more landmark locations derived from content depicted in the image and, for each landmark location, a landmark confidence score that indicates a measure of confidence that the image depicts content associated with the landmark location;

obtaining caption location data for the image, the caption location data specifying one or more caption locations derived from user input and, for each caption location, a caption confidence score that indicates a measure of confidence that the image depicts content associated with the caption location;

obtaining metadata location data for the image, the metadata location data specifying a metadata location derived from data provided by an image capturing device that captured the image;

identifying location pairs from the landmark location data, caption location data, and metadata location data, each location pair including two of a landmark location, caption location, and metadata location;

generating, for each location pair, a geographic consistency score that indicates a measure of consistency between locations specified in the location pair;

ranking each location pair according to a predetermined hierarchy of location types, the predetermined hierarchy specifying a first priority for landmark locations, a second priority for caption locations, and third priority for metadata locations, wherein the ranking of each location pair is based on a highest priority of the locations specified in the location pair;

selecting a location pair based at least in part on the geographic consistency scores and location pair rankings;

selecting an image location for the image from the locations specified in the selected location pair;

determining an image location score for the image location based on a confidence score for one of the locations specified in the selected location pair; and associating the image location and image location score with the image.

14. The computer readable storage medium of claim 13, wherein the operations further comprise:

identifying a confidence score for a location specified in the selected location pair;

identifying a location type for the location; and generating a topicality score for the image based on the identified confidence score and the identified location type.

15. The computer readable storage medium of claim 14, wherein identifying a confidence score for a location specified in the selected location pair comprises identifying a confidence score for a location specified in the selected location pair based on the pre-determined hierarchy of location types.

16. The computer readable storage medium of claim 13, wherein selecting an image location for the image from the locations specified in the selected location pair comprises selecting an image location for the image from the locations specified in the selected location pair based on the pre-determined hierarchy of location types.

17. The computer readable storage medium of claim 14, wherein generating a topicality score for the image comprises:

inputting the identified confidence score into a function that corresponds to the identified location type, wherein the function is one of three different functions that each correspond to a different location type; and obtaining the topicality score for the image as output from the function.

* * * * *